(12) United States Patent
Hotta et al.

(10) Patent No.: US 6,798,819 B1
(45) Date of Patent: Sep. 28, 2004

(54) OPTICAL PICKUP APPARATUS AND METHOD OF MANUFACTURING THE SAME

(75) Inventors: Tohru Hotta, Nagano (JP); Ikuo Kasuga, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/512,313

(22) Filed: Feb. 24, 2000

(30) Foreign Application Priority Data

Apr. 20, 1999 (JP) .......................................... 11-111757

(51) Int. Cl.⁷ .............................................. H01S 3/08
(52) U.S. Cl. ................................... 372/101; 369/44.11
(58) Field of Search ........................ 372/24, 101, 107, 372/15, 29.014, 99, 100, 44.11, 29.01, 98, 16; 369/112.24, 44.32, 44.14, 44.37, 219; 356/237.2; 351/221; 359/368; 606/10

(56) References Cited

U.S. PATENT DOCUMENTS

| | | | | |
|---|---|---|---|---|
| 4,751,695 A | * | 6/1988 | Kaku et al. | 369/44.26 |
| 4,837,757 A | * | 6/1989 | Okada et al. | 369/44.14 |
| 4,866,687 A | * | 9/1989 | Kasai et al. | 369/30.15 |
| 5,088,075 A | * | 2/1992 | Yokota | 369/30.16 |
| 5,195,070 A | * | 3/1993 | Shiba et al. | 369/44.12 |
| 5,353,073 A | * | 10/1994 | Kobayashi | 351/221 |
| 5,377,001 A | * | 12/1994 | Malin et al. | 356/237.2 |
| 5,396,477 A | * | 3/1995 | Matsumoto et al. | 369/44.28 |
| 5,459,325 A | * | 10/1995 | Hueton et al. | 250/458.1 |
| 5,865,832 A | * | 2/1999 | Knopp et al. | 606/10 |
| 5,963,535 A | * | 10/1999 | Yamakawa et al. | 369/219 |
| 6,097,690 A | * | 8/2000 | Mochizuki et al. | 369/112.24 |
| 6,128,258 A | * | 10/2000 | Kimura et al. | 369/44.32 |
| 6,137,765 A | * | 10/2000 | Saito et al. | 369/219 |
| 6,141,300 A | * | 10/2000 | Getreuer et al. | 369/44.14 |
| 6,157,599 A | * | 12/2000 | Yamashita et al. | 369/44.28 |
| 6,172,958 B1 | * | 1/2001 | Mochizuki et al. | 369/44.37 |
| 6,201,639 B1 | * | 3/2001 | Overbeck | 359/368 |

* cited by examiner

*Primary Examiner*—Haissa Philogene
*Assistant Examiner*—Tuan N. Nguyen
(74) *Attorney, Agent, or Firm*—Sughrue Mion, PLLC

(57) ABSTRACT

A deflector deflects laser light emitted from a laser light emitting device. A lens driver moves an objective lens for conversing the laser light deflected by the deflector onto an optical recording disk in a focusing direction and a tracking direction thereof. A frame member supports the laser light emitting device, the deflector and the lens driver. The deflector is positioned such that the center of an intensity distribution of the laser light is aligned with an optical axis of the objective lens.

7 Claims, 6 Drawing Sheets

OPTICAL PICKUP APPARATUS AND METHOD OF MANUFACTURING THE SAME

BACKGROUND OF THE INVENTION

The present invention relates to an optical pickup apparatus used for recording and reproduction of an optical recording disk such as a compact disk (CD), a digital video (or versatile) disk (DVD), or the like, as well as a method of manufacturing the same. More particularly, the present invention concerns a technique for positioning a deflector mounted in an optical pickup apparatus.

As an optical pickup apparatus used for recording and reproduction of an optical recording disk such as a CD or a DVD, one is known in which laser light emitted from a laser diode is deflected by a half mirror, this laser light is built up by being deflected by a total reflection mirror, and this laser light is focused onto the optical recording disk in the form of a spot by an objective lens. The reflected light from the optical recording disk returns to the objective lens and is deflected by the total reflection mirror, and after being transmitted through the half mirror, the return light is focused onto a photodetector by a sensor lens. In the photodetector, a focusing error signal is generated on the basis of the configuration of the spot of the focused laser light, and a tracking error signal is generated by the intensity distribution of the spot.

In the optical pickup apparatus thus configured, when the total reflection mirror is mounted on an apparatus frame, the inclination angle of the total reflection mirror is adjusted to adjust the angle at which the laser light is made incident upon the objective lens, thereby suppressing the generation of coma by means of the objective lens.

With the optical pickup apparatus exclusively used for reproduction, it is not necessarily essential that the center of the spot and the center of the intensity distribution are aligned with each other, there are many cases where the center of the intensity distribution of the laser light emitted from the laser diode is offset from the optical axis of the laser light. In this case, the mere adjustment of the angle at which the laser light is made incident upon the objective lens does not bring the center of the intensity distribution of the laser light into alignment with the center of the spot formed by the objective lens.

Accordingly, if the optical pickup apparatus which also effects the recording on the optical recording disk is configured after the fashion of the optical pickup apparatus exclusively used for reproduction, there is a problem in that the quality of the spot is poor and high-quality recording cannot be effected due to the fact that the center of the spot of the laser light focused on the optical recording disk is offset from the center of the intensity distribution. In addition, if the center of the intensity distribution is offset from the center of the spot of the laser light focused on the optical recording disk, offset occurs in the tracking error signal generated by the photodetector when another optical recording disk is used. There is the problem that high-quality recording cannot be effected for this reason as well.

SUMMARY OF THE INVENTION

Accordingly, the object of the invention is to provide an optical pickup apparatus which is capable of high-quality recording as well as a method of manufacturing the same.

According to an aspect of the present invention, there is provided an optical pickup apparatus comprising:

a laser light emitting device;

a lens driver for moving an objective lens for conversing the laser light deflected by the deflector onto an optical recording disk in a focusing direction and a tracking direction thereof; and a frame member for supporting the laser light emitting device and the lens driver, wherein the optical axis of the objective lens is aligned with the center of the intensity distribution of the laser light.

According to another aspect of the present invention, there is provided a manufacturing method of an opticall pick up apparatus including: a laser light emitting device, a lens driver for moving an objective lens for conversing the laser light deflected by the deflector onto an optical recording disk in a focusing direction and a tracking direction thereof and a frame member for supporting the laser light emitting device and the lens driver, wherein the optical axis of the objective lens is aligned with the center of the intensity distribution of the laser light, the optical pick up prepared by a process comprising the steps of:

adjusting at least one of the laser emitting device and the objective lens in such a manner that the optical axis of the objective lens is aligned with the center of the intensity distribution of the laser light.

DETAILED DESCRIPTION OF THE PREFERRED EMBODIMENTS

Figure 1A:
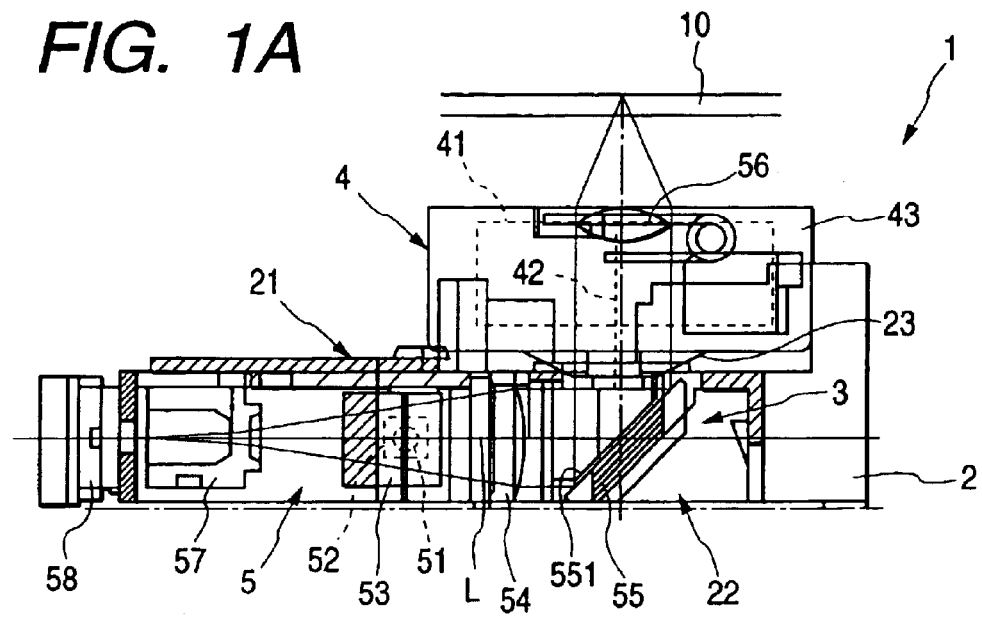
FIGS. 1A and 1B are a cross-sectional view and a bottom view showing an optical pickup apparatus according to one embodiment of the invention, respectively.

Referring now to the drawings, a description will be given of one embodiment of the invention.

Figure 1B:
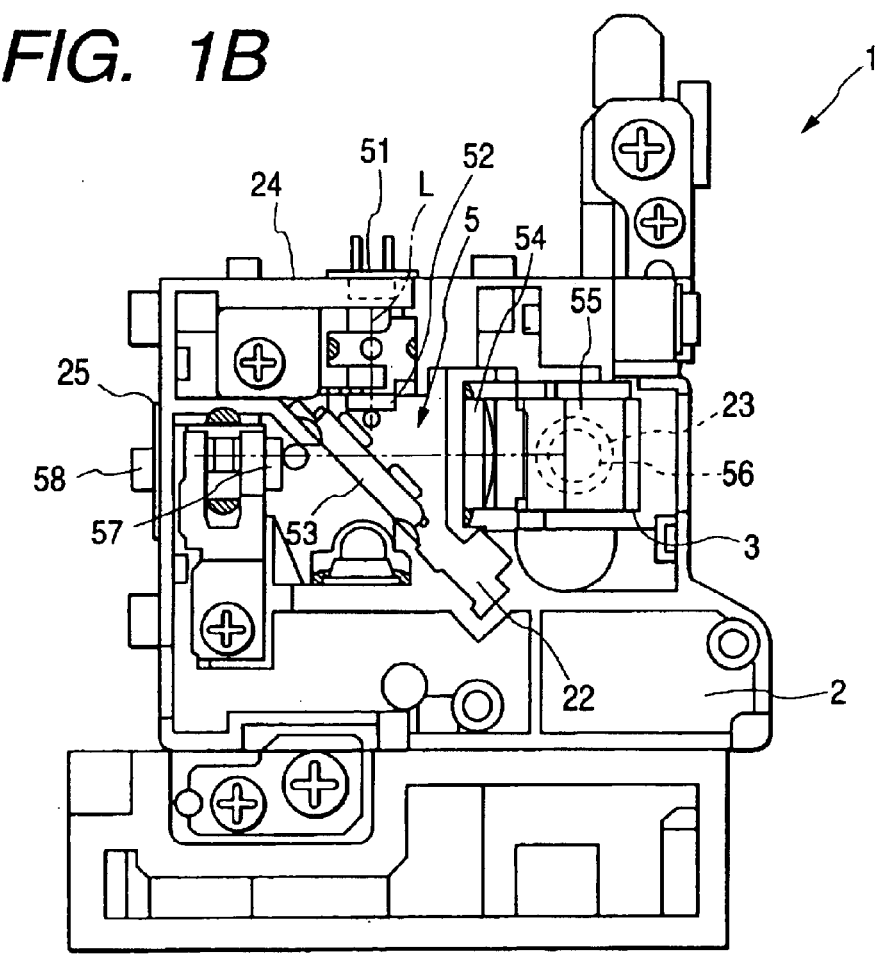

FIGS. 1A and 1B are a cross-sectional view and a bottom view showing an optical pickup apparatus, respectively. As shown in FIGS. 1A and 1B, an optical pickup apparatus 1 has a frame 2 formed in the form of a substantially rectangular thick plate, an objective lens driver 4 mounted on an upper face 21 of the frame 2, and an optical system 5 mounted on a lower face 22 side of the frame 2.

The objective lens driver 4 includes a hollow cylindrical lens holder 41 for holding an objective lens 56, a sliding shaft 42 for supporting the lens holder 41, and a cup-shaped yoke 43 which surrounds an outer peripheral face of the lens holder 41 and to which the sliding shaft 42 is fixed. A focusing magnetic circuit (not shown) for moving the lens holder 41 in the axial direction of the sliding shaft 42 and a tracking magnetic circuit (not shown) for rotating the lens holder 41 about the sliding shaft 42 are arranged between the outer peripheral face of the lens holder 41 and an inner peripheral face of the yoke 43. Accordingly, the objective lens 56 can be moved in the focusing direction and in the tracking direction.

The optical system 5 includes a laser diode 51 (laser-light emitting device) inserted from a side face 24 of the frame 2, as well as a diffraction grating 52, a half mirror 53 a collimator lens 54, and a total reflection mirror 55 (as deflector) which are accommodated in a portion formed by being partitioned on the lower face side of the frame 2, these component elements being arranged in that order along the advancing direction of laser light L emitted from the laser diode 51.

The laser light L emitted from the laser diode 51 passes through the diffraction grating 52, is reflected by the half mirror 53, and is led to the collimator lens 54. The laser light L collimated into a parallel beam of light by the collimator lens 54 is deflected toward the upper face of the frame 2 by the total reflection mirror 55. A circular hole 23 which passes through the frame 2 in its thickness direction is formed above the total reflection mirror 55. Since the objective lens 56 held by the objective lens driver 4 is disposed at a position corresponding to the circular hole 23 above the upper face of the frame 2, the laser light L reflected by the total reflection mirror 55 is led to the objective lens 56, and is focused on an optical recording disk 10 by the objective lens 56.

The return light L from the optical recording disk 10 passes through the objective lens 56 again, is led to the collimator lens 54 by the total reflection mirror 55, and is applied to the half mirror 53. The half mirror 53 allows this return light L to be transmitted therethrough, and leads the return light L to a sensor lens 57 fixed to the frame 2. The return light L is focused on a photodetector 58 attached to a side face 25 of the frame 2 by the sensor lens 57. On the basis of the result of detection by the photodetector 58, a tracking error signal and a focusing error signal are generated, and the objective lens 56 is driven in the tracking direction and in the focusing direction by the objective lens driver 4.

Figure 2:
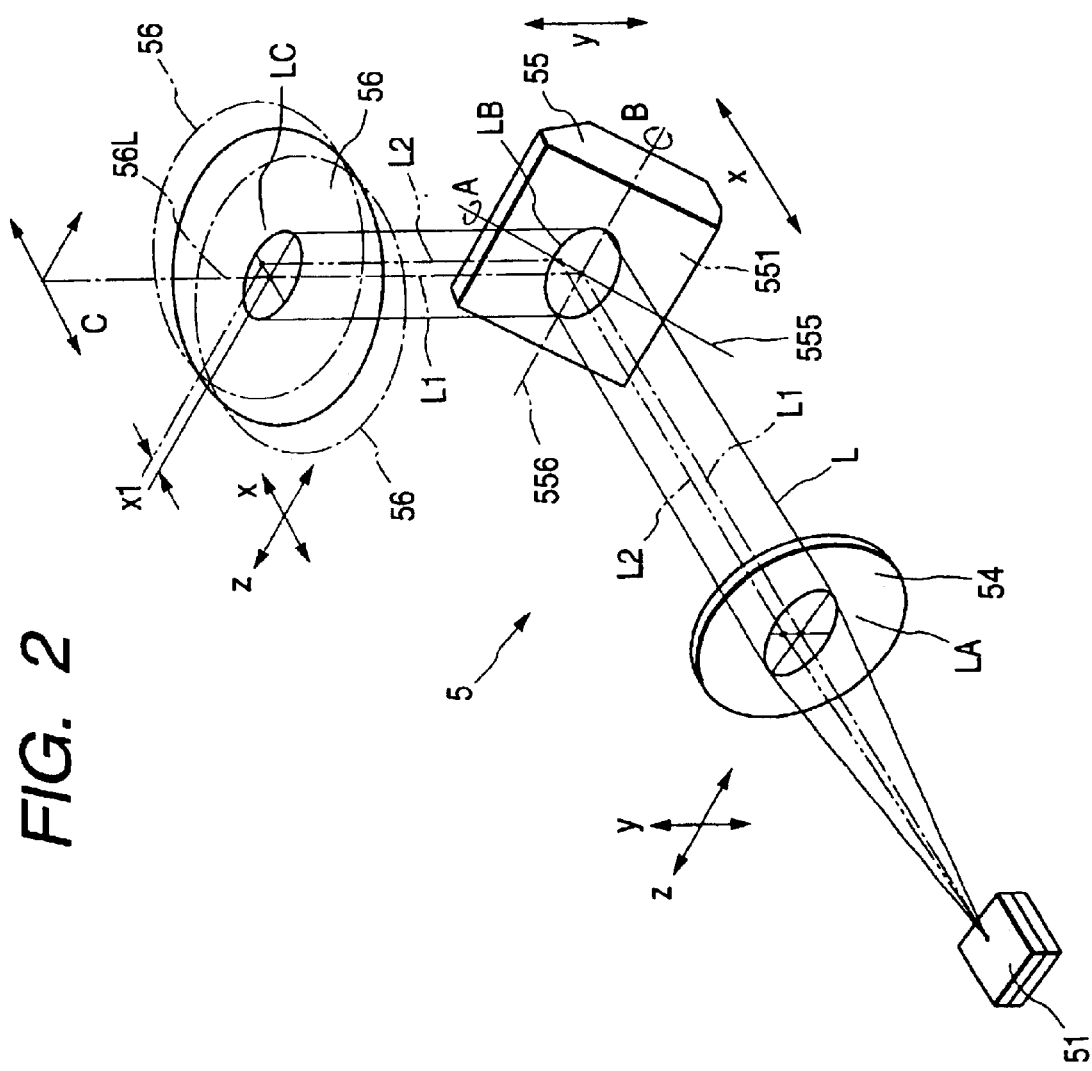
FIG. 2 is a perspective view for explaining the positioning of a total reflection mirror of the apparatus shown in FIG. 1.

Referring to FIG. 2, a description will be given of the method of positioning the total reflection mirror when the total reflection mirror 55 is attached to the frame in the process of manufacturing the optical pickup apparatus in accordance with this embodiment.

FIG. 2 is a perspective view for explaining the positioning of the total reflection mirror 55. It should be noted that, in FIG. 2, the diffraction grating 52 and the half mirror 53 are omitted to simplify the description.

As shown in FIG. 2, the laser light L emitted from the laser diode 51 has an elliptic far field pattern including a short-axis direction in which the angle of divergence is the narrowest (the y direction in the case of the laser light LA from the laser diode 51 to the total reflection mirror 55, and the x direction in the case of the laser light LC from the total reflection mirror 55 to the objective lens 56) of the angular directions perpendicular to an optical axis L1 as well as a long-axis direction which is perpendicular to this short-axis direction x or y and in which the angle of divergence is the broadest (the z direction in both cases of the laser light LA from the laser diode 51 to the total reflection mirror 55 and the laser light LC from the total reflection mirror 55 to the objective lens 56).

A total reflection surface 551 of the total reflection mirror 55 is disposed by being inclined approximately 45° with respect to the direction x or y in which the angle of divergence of the laser light L. In this embodiment, the short-axis direction x of the angle of divergence of the laser light LC incident upon the objective lens 56 is the radial direction of the optical recording disk 10, while the long-axis direction z of the angle of divergence is the direction-of the jitter of the optical recording disk 10.

Further, the total reflection mirror 55 is rotated about a first axis 555 (arrow A) and a second axis 556 so that the optical axis L1 of the laser light LC reflected by the reflection surface 551 becomes parallel (perpendicular to the aperture of the objective lens 56) to an optical axis 56L of the objective lens 56. Namely, the inclination angle of the optical axis L1 of the laser light LC is adjusted with respect to the optical axis 56L of the objective lens 56 by rotating the total reflection mirror 55.

Here, the center L2 of the intensity distribution of the laser light L emitted from the laser diode 51 is slightly offset from the optical axis L1 of the laser light L. Accordingly, even if the optical axis L1 of the laser light L is merely set parallel to the optical axis 56L of the objective lens 56, the center L2 of the intensity distribution of the laser light L is offset from the optical axis 56L of the objective lens 56. For this reason, the center L2 of the intensity distribution of the laser light L is offset from the center of spot focused on the optical recording disk 10 by the objective lens 56, so that effective use cannot be made of the portion of the laser light L where the light intensity is strong (the center L2 of the intensity distribution). For this reason, high-quality recording cannot be effected.

Accordingly, in this embodiment, the alignment of the center of the intensity distribution is effected so as to make effective use of the portion of the laser light L where the light intensity is strong (the center L2 of the intensity distribution).

In particular, in this embodiment, the far field pattern is formed narrowly in the tracking shift direction of the objective lens 56 (in the direction shown by arrow C). In the case where the short-axis direction of the far field pattern is thus aligned with the tracking shift direction of the objective lens 56, unless the optical axis 56L of the objective lens 56 and the center L2 of the intensity distribution of the laser light L are aligned with each other, the center L2 of the intensity distribution of the laser light L is offset greatly from the center of the objective lens 56 when the objective lens 56 has undergone a tracking shift, as shown by the chain lines. Accordingly, in this embodiment, the optical axis 56L of the objective lens 56 and the center L2 of the intensity distribution of the laser light L are aligned with each other in the short-axis direction of the far field pattern, whereby the strong portion of the light intensity is prevented from deviating from the center of the objective lens 56 so as to make effective use of the intense light.

Namely, in this embodiment, after the inclination angle of the total reflection mirror 55 is adjusted as described above, the total reflection mirror 55 is moved in parallel in the x direction in the direction of the optical axis L1 of the laser light L (the x direction from the laser diode 51 to the total reflection mirror 55, and the y direction from the total reflection mirror 55 to the objective lens 56) so as to eliminate the offset x1 in the short-axis direction x of the angle of divergence between the offsets of the center L2 of the intensity distribution of the laser light L from the optical axis 56L of the objective lens 56, thereby forming a high-quality light spot making effective use of the strong portion of the light intensity of the laser light L.

Figure 3:
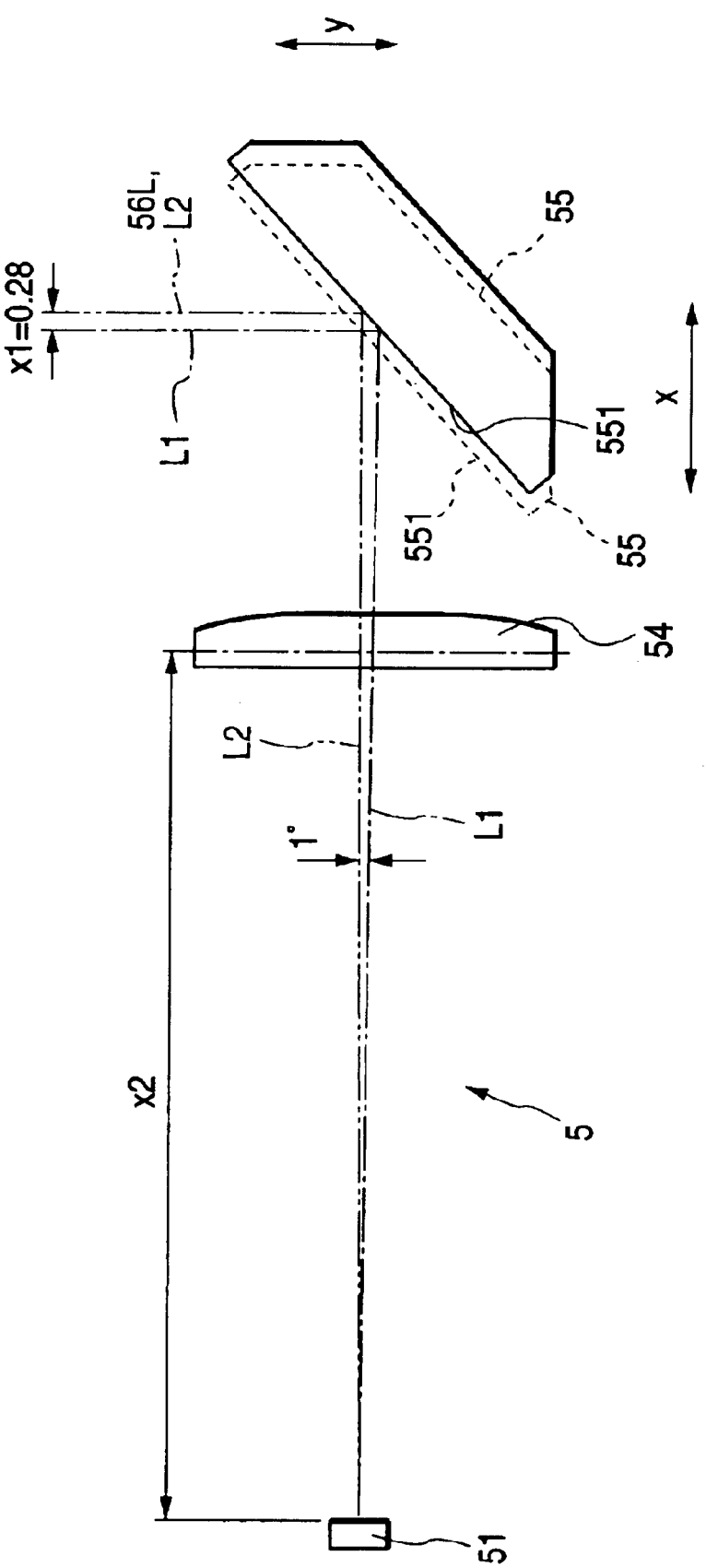
FIG. 3 is a schematic diagram for explaining a specific example of the positioning of the total reflection mirror of the apparatus shown in FIG. 1.

For example, in a case where the center L2 of the intensity distribution of the divergent laser light L emitted from the laser diode 51 is inclined 1° in the y direction with respect to the optical axis L1, as shown in FIG. 3, if the collimator lens 54 having a focal length x2 of 15.5 mm is used, the center L2 of the intensity distribution is offset by 0.28 mm in the x direction from the optical axis 56L of the objective lens 56. To eliminate this offset, it suffices if the total reflection mirror 55 is moved in parallel by 0.28 mm in the x direction as with the total reflection mirror 55 indicated by the dotted line in FIG. 3.

Further, of the offsets of the center L2 of the intensity distribution of the laser light L from the optical axis 56L of the objective lens 56, the offset x1 in the short-axis direction x of the angle of divergence can also be eliminated if the total reflection mirror 55 is moved in parallel in the y direction in the direction of the optical axis L1 of the laser light L so as to cause the reflection surface 551 of the total reflection mirror 55 be aligned with the reflection surface 551 of the total reflection mirror 55 shown by the dotted line in FIG. 3.

Thus, since, of the offsets of the center L2 of the intensity distribution of the laser light LC from the optical axis 56L of the objective lens 56, the offset in the short-axis direction x of the angle of divergence of the laser light LC is eliminated by effecting the positioning of the total reflection mirror 55, the center L2 of the intensity distribution of the laser light L is not offset in the short-axis direction of the angle of divergence with respect to the center of the spot of the laser light L focused on the optical recording disk by the objective lens 56. Here, with the laser light L having the short-axis direction x or y in which the angle of divergence is the narrowest of the angular directions perpendicular to the optical axis L as well as the long-axis direction z which is perpendicular to this short-axis direction and in which the angle of divergence is the broadest, of the offsets of the center L2 of the intensity distribution of the laser light L from the center of the spot focused on the optical recording disk 10 by the objective lens 56, the offset in the short-axis direction x of the angle of divergence of the laser light L exerts the largest effect on the recording quality, and the effect of the offset in the long-axis direction z of the angle of divergence on the recording quality is not very large. For this reason, in this embodiment, a high-quality spot is formed in which the center L2 of the intensity distribution of the laser light L is not offset in the short-axis direction of the angle of divergence with respect to the center of the spot of the laser light L focused on the optical recording disk 10 by the objective lens 56. In addition, in this embodiment, since the spot is formed in which the center L2 of the intensity distribution of the laser light L is not offset in the short-axis direction x of the angle of divergence with respect to the center of the spot of the laser light L focused on the optical recording disk 10, the photodetector 58 for detecting the return light L from the optical recording disk 10 is free from the problem that an offset occurs in the tracking error signal due to the optical recording disk 10 used. Thus, since a high-quality spot can be formed on the optical recording disk and the offset in the tracking error signal does not occur, it is possible to effect high-quality recording.

In addition, in this embodiment, the offset in the short-axis direction x of the angle of divergence of the laser light L is merely eliminated, and it is unnecessary to eliminate the offset in the long-axis direction z of the angle of divergence. Moreover, of the offsets of the center L2 of the intensity distribution of the laser light L from the optical axis 56L of the objective lens 56, the offset in the short-axis direction x of the angle of divergence can be eliminated by the simple method in which the total reflection mirror 55 is merely moved in parallel in the direction of the optical axis L1 of the laser light L. Accordingly, it is readily possible to realize the optical pickup apparatus 1 capable of effecting high-quality recording.

Figure 4A:
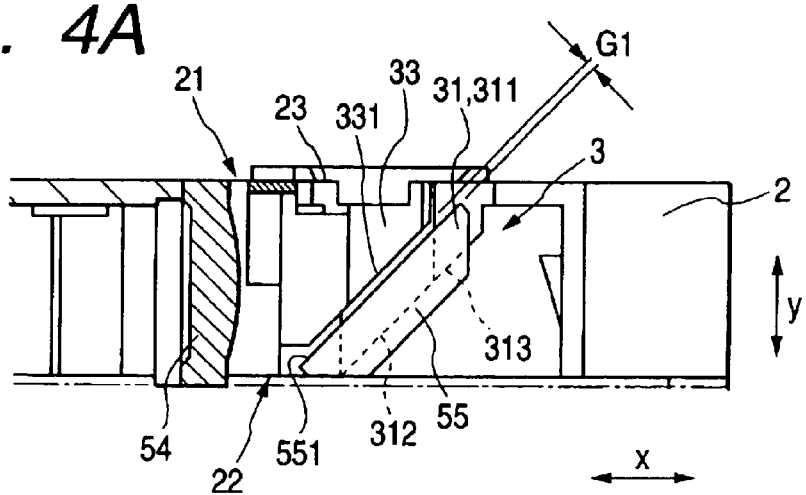
FIGS. 4A to 4C are a right-side elevational view, a bottom view, and a left-side elevational view showing a deflector mounting portion of the apparatus shown in FIG. 1, respectively.
Figure 4B:
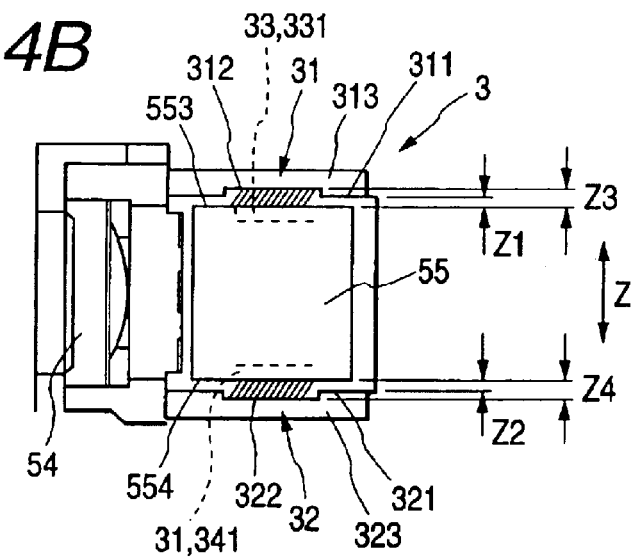
Figure 4C:
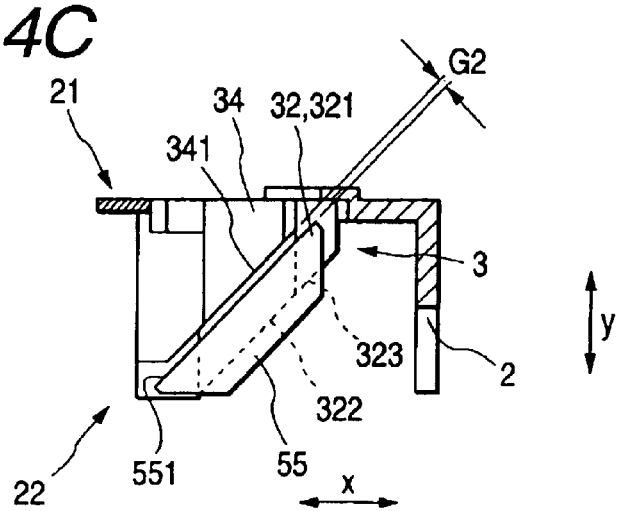

FIGS. 4A to 4C are a right-side elevational view, a bottom view, and a left-side elevational view showing the state in which the total reflection mirror 55 is mounted on the frame 2, respectively. As shown in FIGS. 4A to 4C, a mounting portion 3 (deflector mounting portion) capable of adjusting the position of the total reflection mirror 55 as described above is formed on the frame 2. The mounting portion 3 has first and second mirror guards 31 and 32 which clamp both sides of the total reflection mirror 55 extending transversely with a substantially trapezoidal cross section.

As shown in FIGS. 4A and 4B, the first mirror guard 31 extends from the upper face 21 side of the frame 2 toward the lower face 22 side, and its lower face 313 is inclined substantially parallel to the reflection surface 551 of the total reflection mirror 55. An inner face 311 of the first mirror guard 31 opposes one side face 553 of the total reflection mirror 55 with a gap Z1 of about 0.1 mm therebetween. In addition, a recessed portion 312 which is open in a rectangular shape at the lower face 313 is formed in the inner face 311 of the first mirror guard 31. At this recessed portion 312, a gap Z3 of about 0.3 mm is formed between the side face 553 of the total reflection mirror 55 and the inner face 311 of the first mirror guard 31, and an adhesive agent for fixing the total reflection mirror 55 is filled in this recessed portion 312.

In addition, a projected portion 33 which projects inwardly is formed above the portion where the recessed portion 312 is formed on the inner face 311 of the first mirror guard 31. A lower face 331 of the projected portion 33 is formed in such a manner as to oppose the reflection surface 551 of the total reflection mirror 55 with the gap G1 therebetween when the total reflection mirror 55 is positioned at the position where the optical axis L1 of the laser light L and the optical axis 56L of the objective lens 56 are substantially aligned with each other.

Meanwhile, as shown in FIGS. 4B and 4C, the second mirror guard 32 is formed in such a manner as to be bilaterally symmetrical with the first mirror guard 31. Namely, the second mirror guard 32 extends from the upper face 21 side toward the lower face 22 side, and its lower face 323 is inclined substantially parallel to the reflection surface 551 of the total reflection mirror 55. An inner face 321 of the second mirror guard 32 opposes the other side face 554 of the total reflection mirror 55 with a gap Z of about 0.1 mm therebetween. In addition, a recessed portion 322 which is open in a rectangular shape at the lower face 323 is formed in the inner face 321 of the second mirror guard 32. At this recessed portion 322, a gap Z4 of about 0.3 mm is formed between the side face 554 of the total reflection mirror 55 and the inner face 321 of the second mirror guard 32, and the adhesive agent for fixing the total reflection mirror 55 is filled in this recessed portion 322.

In addition, a projected portion 34 which projects out inwardly is formed above the portion where the recessed portion 322 is formed on the inner face 321 of the second mirror guard 32. A lower face 341 of the projected portion 34 is formed in such a manner as to oppose the reflection surface 551 of the total reflection mirror 55 with the gap G2 therebetween when the total reflection mirror 55 is positioned at the position where the optical axis L1 of the laser light L and the optical axis 56L of the objective lens 56 are substantially aligned with each other.

Thus, since the gaps G1 and G2 are respectively formed between the reflection surface 551 of the total reflection mirror 55 and the respective lower faces 331 and 341 of the projected portions 33 and 34 formed on the first and second mirror guards 31 and 32 when the total reflection mirror 55 is positioned at the position where the optical axis L1 of the laser light L and the optical axis 56L of the objective lens 56 are substantially aligned with each other, the total reflection mirror 55 can be moved in parallel in the direction of the optical axis L (in the x or y direction), as described above.

Figure 5:
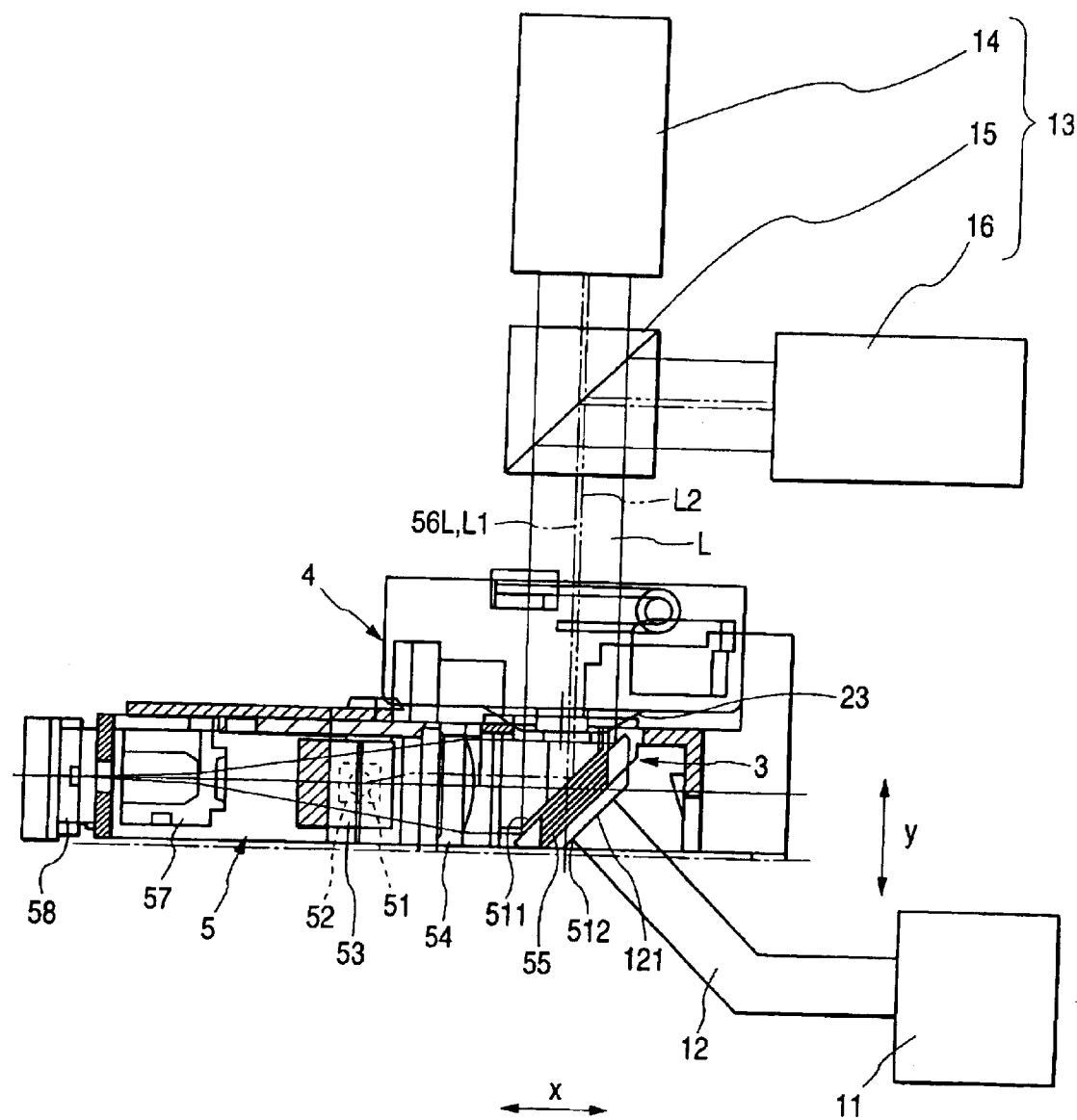
FIG. 5 is a schematic diagram showing the manner in which the positioning of the total reflection mirror of the apparatus shown in FIG. 1 is effected.

FIG. 5 is a schematic diagram showing the manner in which the positioning of the total reflection mirror 55 is effected. As shown in FIG. 5, when the positioning of the total reflection mirror 55 is effected, an adjuster 11 for moving the total reflection mirror 55 and a detector 13 for detecting the laser light L reflected by the total reflection mirror are used.

The adjuster 11 has an arm 12 for supporting the total reflection mirror 55. A distal end 121 of the arm 12 is formed as an air chuck, which is capable of being changed over between the state in which it sucks a reverse surface 512 of the total reflection mirror 55 and the state in which it releases the total reflection mirror 55. In addition, as already described with reference to FIG. 2, the arm 12 is capable of adjusting the inclination angle of the total reflection mirror 55 by using as the first axis 555 the short-axis direction of the angle of divergence of the laser light LB applied to the total reflection mirror 55, as indicated by arrow A. Further, the arm 12 is capable of adjusting the inclination angle of the total reflection mirror 55 by using as the second axis 556 the long-axis direction of the angle of divergence of the laser light LB applied to the total reflection mirror 55, as indicated by arrow B. Furthermore, the arm 12 is capable of moving the total reflection mirror 55 in at least one of the directions x and y of the optical axis L1 of the laser light L. Thus the adjuster 11 has the inclination angle adjusting function for adjusting the inclination angle of the total reflection mirror 55 and the moving function for adjusting the position of the total reflection mirror 55.

The detector 13 has an autocollimator 14, a half mirror 15, and a parallel-light intensity-distribution measuring device 16. When the laser light L is measured by using the detector 13, the objective lens 56 is removed from the objective lens driver 4 such that the laser light L reflected by the total reflection mirror 55 is led as it is in the form of parallel light to the detector 13. The laser light L reflected by the total reflection mirror 55 is transmitted through the half mirror 15 and is led to the autocollimator 14. Meanwhile, the light reflected by the half mirror 15 is led to the parallel-light intensity-distribution measuring device 16. The offset of the center L2 of the intensity distribution of the laser light L from the optical axis 56L of the objective lens 56 can be detected by the parallel-light intensity-distribution measuring device 16.

To effect the positioning of the total reflection mirror 55 by using these devices, first, the total reflection mirror 55 is supported by the arm 12 of the adjuster 11, and while the laser light L is being detected by the detector 13, the inclination angle of the total reflection mirror 55 is adjusted such that the optical axis L1 of the laser light L incident upon the objective lens 56 becomes parallel to the optical axis 56L of the objective lens 56. Next, on the basis of the result of detection by the detector 13, the total reflection mirror 55 is moved in parallel in the x or y direction so as to eliminate the offset in the short-axis direction of the angle of divergence of the laser light L between the offsets of the center L2 of the intensity distribution of the laser light L from the optical axis 56L of the objective lens 56.

After completion of the positioning of the total reflection mirror 55 in the above-described manner, while the total reflection mirror 55 is being supported by the arm 12 of the adjuster 11, the total reflection mirror 55 is bonded and fixed to the first and second mirror guards 31 and 32 formed on the frame 2, as already described with reference to FIG. 4B. By so doing, since the total reflection mirror 55 is supported by the arm 12 of the adjuster 11 until it is bonded to the frame 2, the total reflection mirror 55 can be fixed to the frame 2 even if the total reflection mirror 55 has been positioned in a state of floating with respect to the frame 2 as the result of performing the inclination angle adjustment and position adjustment of the total reflection mirror 55.

Figure 6A:
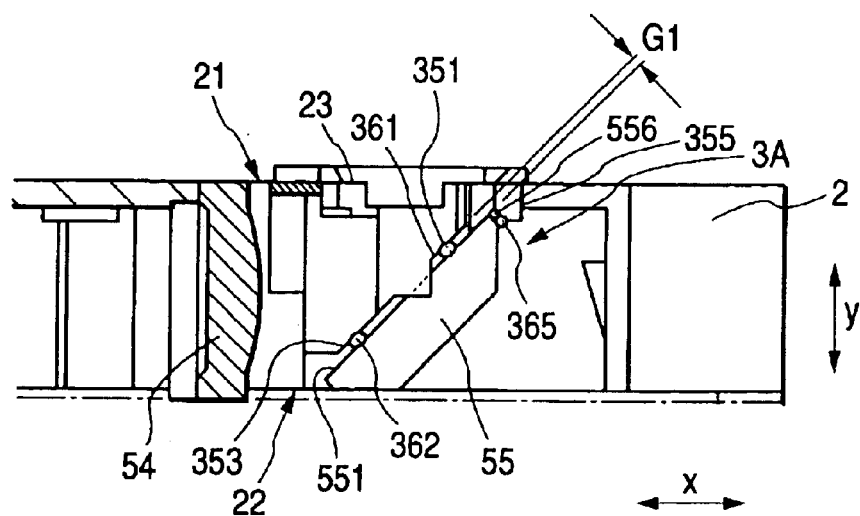
FIGS. 6A and 6B are a side elevational view and a bottom view showing an optical pickup apparatus according to another embodiment of the invention, respectively.
Figure 6B:
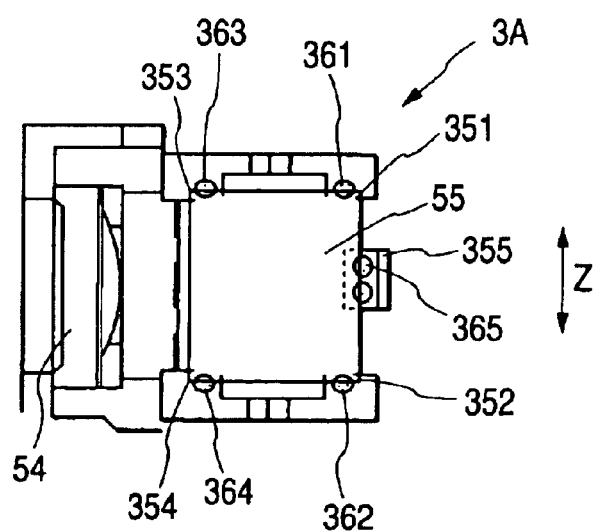

FIGS. 6A and 6B are a right-side elevational view and a bottom view showing another embodiment of the mounting portion 3 for mounting the total reflection mirror. In these drawings, portions corresponding to those of FIG. 4 will be denoted by the same reference numerals, and a description thereof will be omitted.

A mirror mounting portion 3A in this example has mirror supporting faces 351 to 354 to which four corner portions of the reflection surface 551 of the mirror 55 are secured by means of adhesive agents 361 to 364, as well as a mirror abutting portion 355 against which one end face 556 of the mirror 55 abuts. Accordingly, the mirror 55 is mounted on the mirror mounting portion 3A in such a manner as to be capable of being moved freely in the direction of the optical axis of the emergent laser light and in the direction of the optical axis of the objective lens. After the mirror 55 is positioned, the mirror supporting surfaces 351 to 354 and the mirror 55 are bonded and fixed to each other by means of the adhesive agents 361 to 364. In addition, the mirror abutting portion 355 and the end face 556 of the mirror 55 may be also bonded and fixed to each other by an adhesive agent 365.

In the case where the mirror mounting portion 3A constructed as described above is provided, by moving the mirror 55 in, for example, the direction of the optical axis of the objective lens, i.e., in the y direction in FIG. 3, the position for reflecting the laser light in the mirror 55 can be moved vertically in the y direction, whereby adjustment can be made such that the center of the intensity of the laser light is positioned at the center of the light spot formed on the optical recording medium. In FIG. 6A, the mirror 55 is bonded and fixed to the mirror supporting faces 351 to 354 in the state in which a gap G1 is formed between each of the mirror supporting faces 351 to 354 and the mirror reflection surface 551.

It should be noted that, in the above-described embodiment, of the offsets of the center L2 of the intensity distribution of the laser light L from the optical axis 56L of the objective lens 56, the offset in the short-axis direction of the angle of divergence of the laser light L is merely eliminated, the offset in the long-axis direction of the angle of divergence may also be eliminated by such as adjusting the inclination angle of the total reflection mirror 55, so as to cause the optical axis L1 of the laser light L to be completely aligned with the optical axis 56L of the objective lens 56.

It should be noted that, in the above-described embodiment, the optical pickup apparatus comprises the total reflection mirror 55 as the deflector, an optical axis of an objective lens and a center of intensity distribution of laser light emitted from a laser light emitting device may be aligned with each other without using the deflector but the laser emitting device or the objective lens. The above description regarding a case where the deflector is used for the optical axis alignment has been provided in view of ease of adjustment, however, even in the optical pickup apparatus comprising the deflector, the optical axis alignment may be accomplished by adjusting the laser emitting device or the objective lens properly.

As described above, since the center of the intensity distribution of the light emitted from the laser-light emitting device is aligned with the optical axis of the objective lens by the positioning of the deflector, the optical pickup apparatus in accordance with the invention is capable of forming a high-quality spot in which the center of the intensity distribution of the laser light is aligned with the center of the spot focused on the optical recording disk by the objective lens. For this reason, the photodetector for detecting the return light from the optical recording disk is free from the problem that an offset occurs in the tracking error signal due to the optical recording disk used. Thus, it is possible to form a high-quality spot on the optical recording disk and effect high-quality recording since the offset in the tracking error signal does not occur.

In addition, in the invention, of the offsets of the center of the intensity distribution of the laser light from the optical axis of the objective lens, the offset in the short-axis direction of the angle of divergence of the laser light is eliminated by positioning the deflector. If such an: arrangement is adopted, the center of the intensity distribution of the laser light is not offset in the short-axis direction of the angle of divergence with respect to the center of the spot of the laser light focused on the optical recording disk by the objective lens. In the invention, high-quality recording can be effected since, of the offsets of the center of the intensity distribution of the laser light from the center of the spot focused on the optical recording disk by the objective lens, the offset in the short-axis direction of the angle of divergence of the laser light exerts a large effect on the recording quality, and the effect of the offset in the long-axis direction of the angle of divergence on the recording quality is not very large. In addition, since the offset in the short-axis direction of the angle of divergence of the laser light is merely eliminated, and it is unnecessary to eliminate the offset in the long-axis direction of the angle of divergence, the positioning of the deflector can be simplified by that portion.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical pickup apparatus comprising:

a supporting frame a laser light emitting device, supported by the supporting frame which emits light having an elliptical far field pattern having a short axis and a long axis;

a deflector, operable to deflect laser light emitted from the laser emitting device, the deflector supported by the supporting frame;

an objective lens, supported by the supporting frame, operable to converse the laser light deflected by the deflector onto an optical recording disk;

wherein the deflector is adjustable to adjust the deflection angle of the deflected laser light, such that the short axis of the reflected light is aligned with a radial direction of the optical recording disk; and wherein the deflector is adjustable to adjust the distance between the deflector and the laser light emitting device, such that the center of the intensity distribution of the reflected laser light is aligned with the optical axis of the objective lens; and a lens driver, supported by the supporting frame, the lens driver operable to move the objective lens in a focusing direction and a tracking direction of the optical recording disk.

2. A method of manufacturing an optical pickup apparatus comprising the steps of:

providing a laser light emitting device, emitting laser light having an elliptical far filed having a short axis and a lone axis, for recording information on an optical recording disk;

providing a deflector for deflecting laser light emitted from the laser light emitting device;

providing an objective lens for converging the laser light deflected by the deflector onto the optical recording disk;

adjusting the deflection angle of the deflector such that the short axis of the deflected laser light is aligned with a radial direction of the optical recording disk;

adjusting the distance between the deflector and the laser light emitting device to such that the center of an intensity distribution of the laser light is aligned with the optical axis of the objective lens; and securing the deflection angle of the deflector and the distance between the deflector and the laser light emitting device.

3. The manufacturing method as set forth in claim 2, wherein the adjustment of the deflection angle of the deflector is effected such that the laser light is incident perpendicularly to an aperture of the objective lens.

4. The manufacturing method as set forth in claim 2, further comprising the steps of:

providing an adjuster for adjusting the deflection angle of the deflector in the first axial direction parallel with a direction in which the diverging angle of the laser light emitted from the laser light emitting device becomes the narrowest and a second axial direction parallel with a direction in which the diverging angle of the laser light becomes the broadest, and for moving the deflector in the direction parallel with the optical axis of the laser light;

setting the deflector to the adjuster so as to be supported thereby before the adjusting step; and bonding the deflector onto the frame member after the moving step together with the adjuster supporting the deflector;

wherein the adjusting step and the moving step is effected by the adjuster.

5. The optical pickup apparatus as set forth in claim 1, wherein the optical axis of the laser light is aligned with the tracking direction when viewed from a direction parallel with the optical axis of the objective lens.

6. The optical pickup apparatus as set forth in claim 1, wherein the laser light emitting device records information on the optical recording disk with the laser light.

7. An optical pickup apparatus manufactured by the method as set forth in claim 2.

* * * * *